F. J. DOWNING.
PLOW.
APPLICATION FILED DEC. 18, 1909. RENEWED FEB. 5, 1913.
1,072,838.
Patented Sept. 9, 1913.
3 SHEETS—SHEET 1.
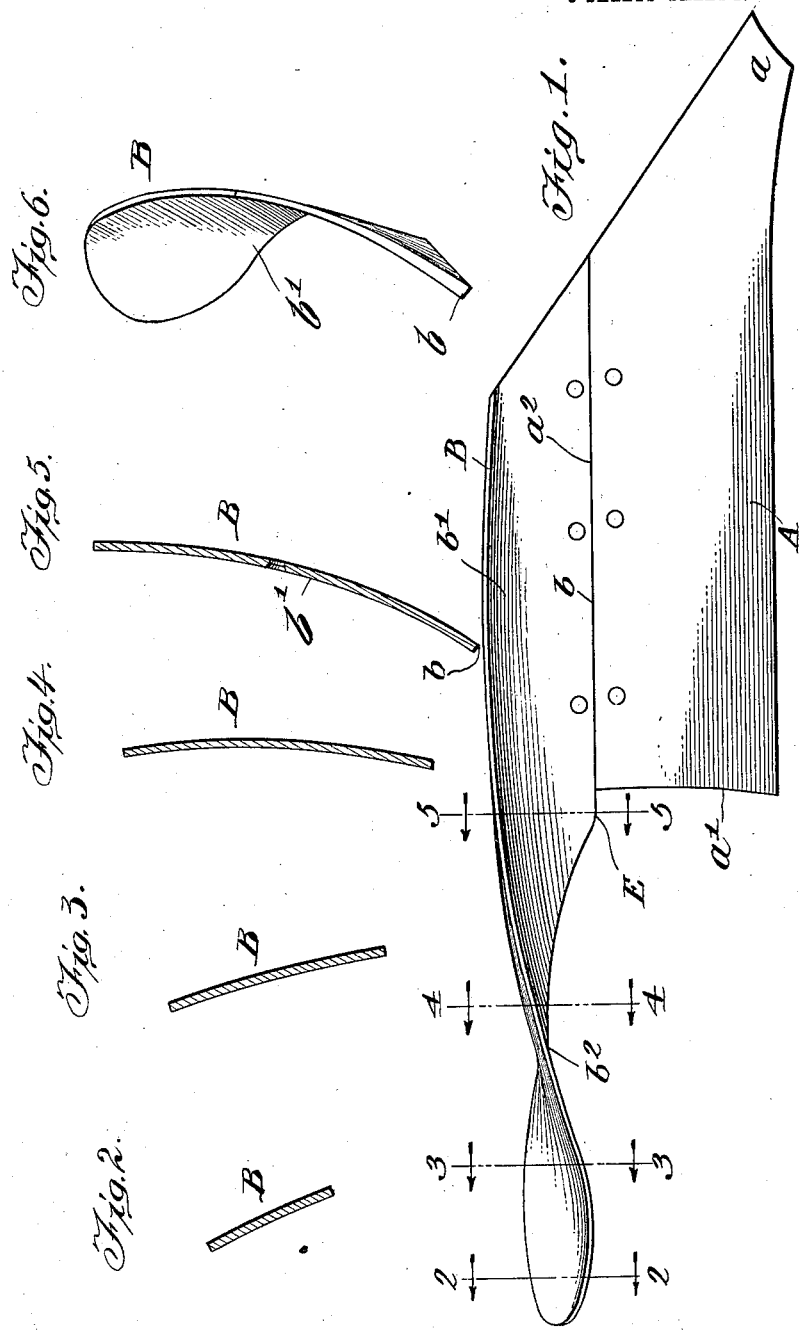

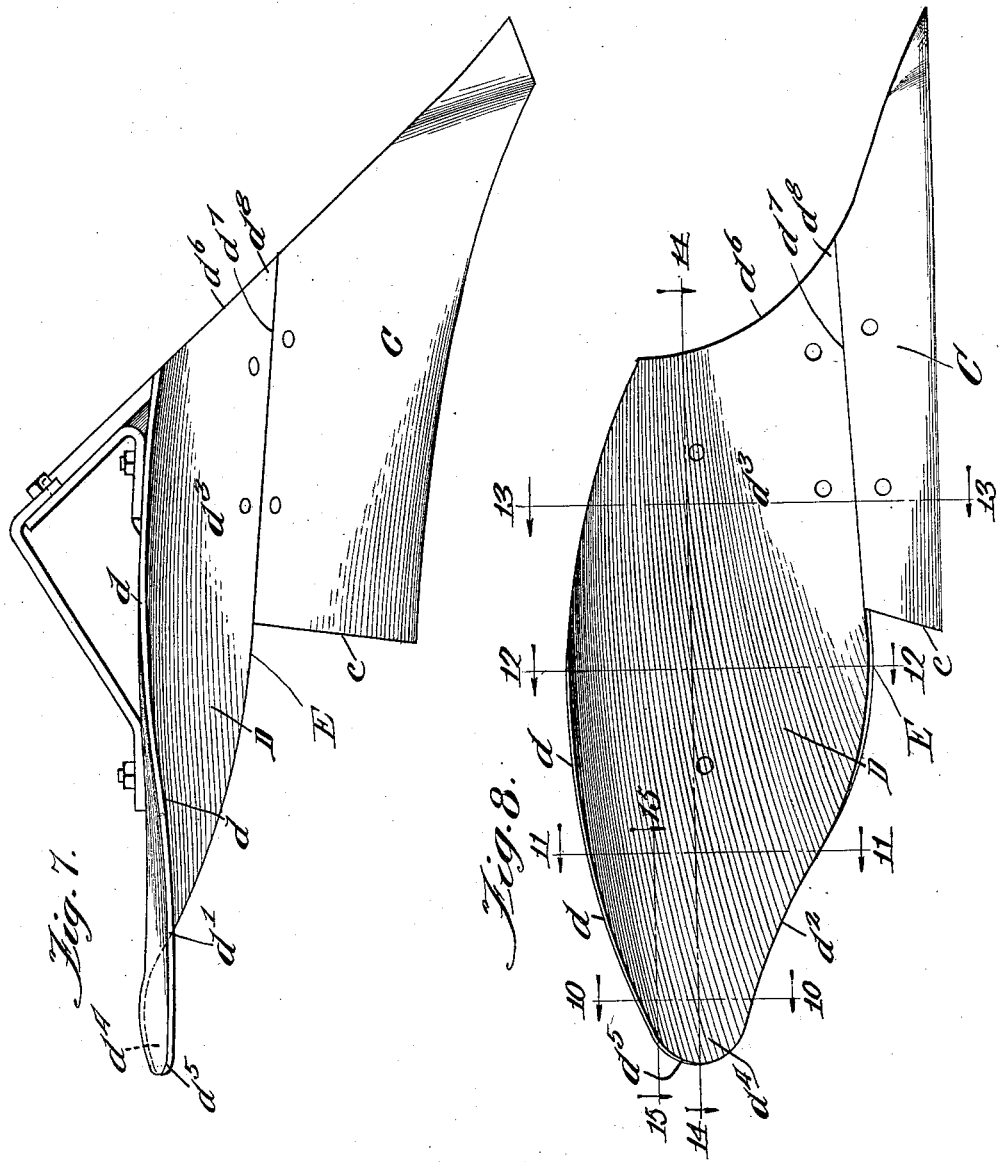

F. J. DOWNING.
PLOW.
APPLICATION FILED DEC. 18, 1909. RENEWED FEB. 5, 1913.
1,072,838.
Patented Sept. 9, 1913.
3 SHEETS—SHEET 3.
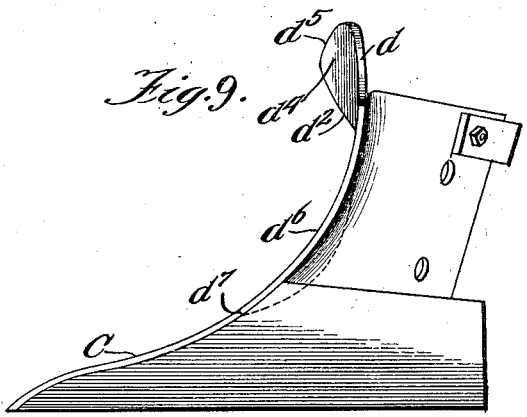
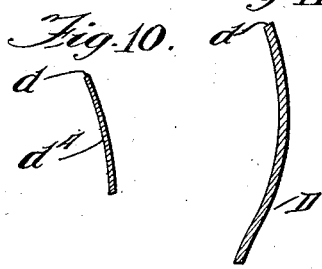
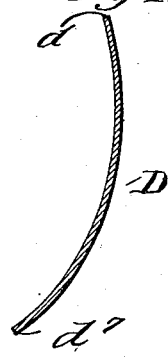
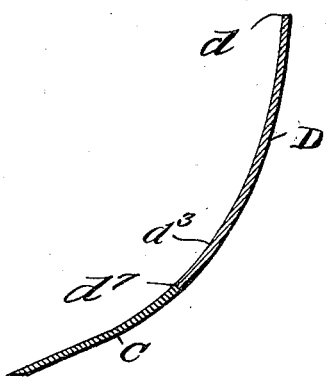
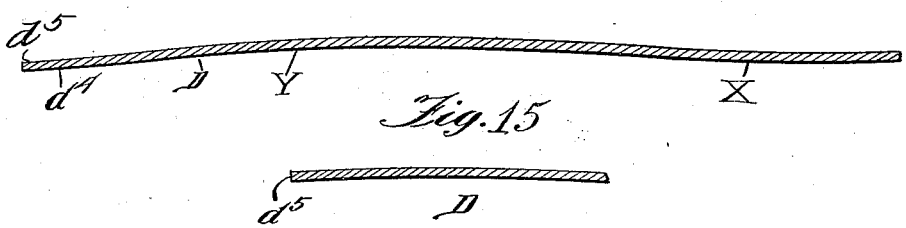
Witnesses:
Inventor:
Frank J. Downing
By Bulkley, ...
Att'ys

UNITED STATES PATENT OFFICE.

FRANK J. DOWNING, OF ROCK ISLAND, ILLINOIS, ASSIGNOR TO ROCK ISLAND PLOW COMPANY, OF ROCK ISLAND, ILLINOIS, A CORPORATION OF ILLINOIS.

PLOW.

1,072,838.   Specification of Letters Patent.   Patented Sept. 9, 1913.

Application filed December 18, 1909, Serial No. 533,883. Renewed February 5, 1913. Serial No. 746,422.

*To all whom it may concern:*

Be it known that I, FRANK J. DOWNING, a citizen of the United States of America, and resident of Rock Island, Rock Island county, Illinois, have invented a certain new and useful Improvement in Plows, of which the following is a specification.

My invention contemplates a plow which will do good work in all kinds of soil.

Prior to my invention, it was customary to use different plows for different kinds of soil, or to substitute one mold-board for another on the same plow. For example, it was found that the mold-board which would do good work in sod or stubble would not do good work in sand and other kinds of soil, and vice versa, so that a mold-board of one shape was necessary for one kind of soil and a mold-board of quite a different shape was necessary for another kind of soil. This, of course, was objectionable, as in the cultivation of a large tract of land it was often found necessary to have several plows, or to provide a number of differently shaped mold-boards for the same plow. Moreover, the soil is liable to vary considerably within a short distance, so that a plow will often encounter widely different kinds of soil before it can get to the end of a comparatively short furrow. With a plow constructed in accordance with my invention, however, this difficulty is entirely eliminated, and one plow is rendered suitable and entirely satisfactory for all kinds of soil. The shape of the mold-board, as will hereinafter more fully appear, is such that efficient and satisfactory results are obtained with either sand or stubble or sod, or with any of the other various kinds of soil. In each case the soil is turned completely upside down and thrown into the previous furrow, the mold-board having a twist at its rear end which tends to throw the soil over and break it up before it falls into the previous furrow. This is true, I find, when the plow is working in either sand or sod or other soil, and after the plowing is finished the field is flat and smooth. And in this way, as will hereinafter more fully appear, one plow is amply sufficient and entirely satisfactory for all kinds of soil.

In the accompanying drawings, Figure 1 is a plan of the share and mold-board of a plow embodying the principles of my invention. Fig. 2 is a vertical section on line 2—2 in Fig. 1. Fig. 3 is a vertical section on line 3—3 in Fig. 1. Fig. 4 is a vertical section on line 4—4 in Fig. 1. Fig. 5 is a vertical section on line 5—5 in Fig. 1. Fig. 6 is an end view of the mold-board shown in Fig. 1. Fig. 7 is a plan of a plow embodying the principles of Fig. 1, but showing the proportions required for one of somewhat smaller dimensions—that is to say, Fig. 1 shows a large plow and Fig. 7 shows a relatively small plow; the two figures show how the curves and lines may vary somewhat, for plows of different size, without departing from the spirit of my invention. Fig. 8 is a side and front elevation of the plow shown in Fig. 7, looking directly at the face of the mold-board. Fig. 9 is a front elevation of the plow shown in Fig. 7, looking in the direction of the length of the mold-board. Fig. 10 is a vertical section on line 10—10 in Fig. 8. Fig. 11 is a vertical section on line 11—11 in Fig. 8. Fig. 12 is a vertical section on line 12—12 in Fig. 8. Fig. 13 is a vertical section on line 13—13 in Fig. 8. Fig. 14 is a horizontal section on line 14—14 in Fig. 8. Fig. 15 is a fragmentary or partial horizontal section on line 15—15 in Fig. 8.

As thus illustrated, and referring to Figs. 1 to 6, inclusive, it will be seen that my improved plow comprises a share A, which has a point or toe $a$, a square rear end $a'$, and a straight or substantially straight upper edge $a^2$. The mold-board B has a straight or substantially straight lower edge $b$ that is joined to the edge $a^2$ of the share, the face of the mold-board sloping backward and upwardly therefrom. The forward scouring surface $b'$ of the mold-board includes the greater portion of the area of the mold-board, and is made concave and so shaped that it faces obliquely upward for a distance from its forward end to a point in rear of its middle or maximum width, which point is indicated at $b^2$ in Fig. 1. At this point $b^2$ the mold-board is very nearly vertical, although concave on its forward surface, and from this point on to the rear of the mold-board it faces outward and downward. As shown, therefore, the mold-board B faces obliquely upward at a decreasing angle to the horizontal from its forward end to a point in rear of its maximum width, and then faces downward at an increasing angle to the horizontal for the remainder of its length. Thus the curved upper edge of the mold-board is, at the point $b^2$, directly above and disposed at an angle to the lower edge of the mold-board. The way in which the mold-board is twisted at its rear end, so that its scouring surface or front surface gradually changes from an upward direction to a downward direction is clearly shown in Figs. 2 to 6 inclusive.

The shape of the mold-board may vary somewhat, according to the size of the plow, but its formation will perhaps be better understood by reference to Figs. 7 to 10, inclusive. Here it will be seen that the share C is of substantially the same shape and formation as that shown in Fig. 1, and that the mold-board D is of substantially the same shape and formation, so far as principle is concerned, as that previously shown and described. The curved upper edge $d$ of the mold-board is highest at its middle—that is to say, substantially at the maximum width of the mold-board, which maximum width is at or near the line 13—13 in Fig. 8. The said upper edge $d$ extends forward at a varying angle for the full length thereof, so that no portion of said edge extends or points downward, the edge being right side up throughout its length, notwithstanding that its angle of inclination varies considerably. At the forward end of the mold-board the said upper edge $d$ is nearly vertical; but back of this the edge leans constantly to the furrow side of the plow, so that by the time the point indicated by the line 10—10 is reached, the said upper edge has a marked forward and outward inclination, as shown more clearly in Fig. 10, or as indicated in Fig. 2 for the previously described plow. The rear end $c$ of the share is, it will be seen, a little in advance of the maximum width of the mold-board, so that the soil is carried well to the rear before being turned over and dropped in the previous furrow. In other words, a rear extension E is provided on the lower edge of the moldboard to prevent loose dirt from falling back into the furrow. In Fig. 7, it will be seen that the upper edge $d$ is, at the point $d'$, disposed immediately over and at an angle to the lower edge $d^2$ of the mold-board. In this way the said mold-board has a forward and upwardly facing portion $d^3$ of relatively large area and a slightly downwardly facing rear end portion $d^4$, which latter serves to break the soil more or less before it is dropped in the previous furrow. The lower edge $d^2$ is, it will be seen, of irregular formation, being curved slightly upward between the lines 11 and 12; and it will also be seen that the rearwardly converging upper and lower edges of the mold-board are merged into and joined by a short outward curve $d^5$. The forward edge $d^6$ of the mold-board is curved backward and upward, and its rearward edge $d^7$ is straight or substantially so and joins or meets the straight upper edge of the share C, whereby the share and the mold-board together present a practically smooth and unbroken surface where they meet.

The land-side $d^8$ of the plow is practically straight, and it will be seen that the mold-board D extends for its full length in a direction which is at right angles, or substantially so, to the said land-side. Following the line 14—14 in Fig. 8, and referring to Fig. 14, it will be seen that the mold-board presents a forward curve or bulge X at its front, and an inward curve or hollow Y at its rear. This gives the board a sort of bulge or roll from its front end back toward its rear end. The soil sinks into the hollow of the board and is released below the lower edge of the board at $d^2$, the portion $d^4$ serving to turn the soil over and break it as it is thrown down into the hollow of the previous furrow. A little higher up the rear portion of the board, when tested by the line 15—15, presents the hollow or backwardly curved appearance shown in Fig. 15; but these longitudinal curves may, of course, be varied more or less without departing from the spirit of my invention, and in accordance with different sizes of plow.

When viewed from above, the general direction of the mold-board is substantially at an angle of thirty-five degrees to the straight land-side of the plow, and when thus viewed the upper edge of the mold-board has the appearance of a compound curve. The longer and forward portion of this compound curve extends to the rear, whereas the shorter and rear end portion of this compound curve bulges outward or extends to the front, as shown in Figs. 1 and 7. Thus it will be seen that the mold-board has a twist which enables it to not only turn the soil over, regardless of the character thereof, but also to release the same properly and break it up before it is dropped in the hollow of the previous furrow. The lower edge of the mold-board, when viewed from above, extends in an irregular curve, directly across the curve presented by the upper edge of the mold-board.

With a plow and mold-board thus constructed, I find that the result is satisfactory in all kinds of soil. It works equally well in stubble and sod and gives good results in clay and is perfectly satisfactory in sand or lighter soils.

The extension E is below the highest point on the upper edge of the moldboard, or substantially so, as shown more clearly in Fig. 8, where it will be seen that this means that the highest point on the upper edge of the moldboard is over, or substantially over, the lowest point on the lower edge thereof. Thus the board is wider in front of the twist—that is, in front of the most nearly vertical portion of the board, than at the rear thereof. With this construction, and by reason of the extension E, which latter is on the lower edge of the board just back of the rear edge of the share, being formed by a downward and rearward enlargement of the board at the forward end of the lower edge thereof that travels a distance above the bottom of the furrow, the loose soil cannot fall back into the furrow; and neither can sand or similar soil boil over the top of the moldboard, because of the height of the moldboard in front of the twist. Thus, and regardless of the character of the soil, it can neither fall off nor boil over and must always pass backward to the twist where it is then turned over and broken up. The rear portion of the board faces forward and downward, and is much narrower than the body of the board in front of the twist, so that it acts in the manner described.

As I am the first to combine the rear twist with the extension on the lower edge of the moldboard, for the purpose set forth, I do not, therefore, limit myself to the exact construction of moldboard and share shown and described.

What I claim as my invention is:

1. In a plow, a mold board and a share adapted to be attached thereto, said mold board at the forward part of its lower free edge extending downwardly and rearwardly and then upwardly, said lower portion being concave on the face to prevent loose soil from falling back into the furrow and a twist back of said lower curved portion at the rear of the mold board whereby the rear portion of the mold board faces downward to turn the soil over and break it up.

2. In a plow, a mold board and a share adapted to be attached thereto, said mold board at the forward part of its lower free edge extending rearwardly at substantially the same inclination as its line of attachment to the share, and then upwardly and inwardly toward the land side, said lower portion being concave on the face to prevent loose soil from falling back into the furrow, and a twist back of said lower curved portion at the rear of the mold board, whereby the rear portion of the mold board faces downward to turn the soil over and break it up.

3. In a plow, a mold board and a share adapted to be attached thereto, said mold board at the forward part of its lower free edge extending rearwardly at substantially the same inclination as its line of attachment to the share and then upwardly and inwardly toward the land side, said lower portion being concave on the face to prevent loose soil from falling back into the furrow.

Signed by me at Rock Island, Illinois, this 6th day of December, 1909.

FRANK J. DOWNING.

Witnesses:
JAS. F. GARDNER,
C. E. P. LAOPE.

---

Copies of this patent may be obtained for five cents each, by addressing the "Commissioner of Patents, Washington, D. C."